United States Patent Office 2,900,392
Patented Aug. 18, 1959

2,900,392

PREPARATION OF DITHIANES

Nathaniel L. Remes, Elgin, and William A. Krewer, Arlington Heights, Ill., assignors to The Pure Oil Company, Chicago, Ill., a corporation of Ohio No Drawing. Application December 20, 1955
Serial No. 554,139

6 Claims. (Cl. 260—327)

This invention relates to the preparation of sulfur-containing, heterocyclic compounds. It is more specifically concerned with the synthesis of heterocyclic hydrocarbons having two sulfur atoms in a hexatomic ring.

It is known that the sulfur analogue of dioxane, dithiane, as well as substituted dithianes have a variety of uses. Compounds of this nature are useful as chemical intermediates. For example, addition compounds of dithiane and metallic salts corresponding to dioxane addition compounds have been prepared. Dithianes also have certain end applications without further reaction with other chemical compounds, and may be used per se as lubricating oil additives for imparting extreme pressure characteristics to lubricating mineral oils, as plasticizers for use in the preparation of synthetic and natural high molecular weight elastomers or polymers, etc. There are available in the prior art a number of procedures for synthesizing dithianes having the formula:

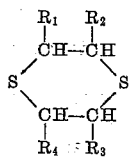

where $R_1$, $R_2$, $R_3$ and $R_4$ are hydrogen, or monovalent organic radicals. It is known that olefins may be treated with sulfur dichloride and further reacted with sodium sulfide to yield 1,4-dithianes (Glavis, Ryden and Marvel, J. Am. Chem. Soc., 59, 707 (1937)). Another reaction involving the use of sodium sulfide as the sulfurizing agent involves the treatment of organic dibromides with sodium sulfide (Garvilov and Tischenko, J. Gem. Chem. (USSR), 17, 967 (1947)). Some work has also been reported on the use of activated alumina for catalyzing dithiane synthesis reactions. For example, this catalyst has been used in promoting the reaction between ethylene oxide and hydrogen sulfide at temperatures of about 200° C. to produce dithiane (Doklady Akad. Nauk (USSR), 63, 285 (1948)). Other reactants, which will interact with hydrogen sulfide in the presence of alumina at temperatures of 200°–400° C. to produce dithianes, include thiodiethylene glycol and p-oxathiane (Y. Yureva and K. Noutskii, Chem. Ab., 44, 1904 (1950)).

In U.S. Patent 2,094,837 there is described the preparation of alkylene sulfides by reacting alkylene oxide and a salt of thiocyanic acid at low temperatures. It has now been found that dithianes may be prepared by reacting alkylene oxides or alkylene sulfides containing at least five carbon atoms, with an inorganic thiocyanate under certain reaction conditions.

Accordingly, it is an object of this invention to provide a practical and economical method for the production of dithianes. This and other objects will be more apparent from the following detailed description of the instant invention.

According to this invention, it has been found that dithianes and substituted dithianes may be prepared by reacting an inorganic thiocyanate with an epi-compound, containing at least five carbon atoms per molecule and at least one hetero atom selected from the group consisting of oxygen and sulfur attached to two directly connected carbon atoms in the carbon chain, in the presence of a mutual solvent which provides at least partial miscibility of the two components of the reaction system, under atmospheric, superatmospheric, or subatmospheric pressure, and at temperatures from about 50°–200° C.

The following specific examples illustrate suitable applications of the instant invention and show the results obtained thereby. It is to be understood that these examples are given for illustrative purposes and are not intended to place any restrictions or limitations on the subject invention.

Example 1

A mixture of 9.1 grams of 1,2-epoxydodecane, 7.3 grams of potassium thiocyanate, and 30 ml. of methanol were heated under reflux at a temperature of 66° C. for five hours. The mixture was poured into water, extracted with benzene, the benzene extract was washed with water, and then the benzene was removed by distillation. Distillation of the residue yielded a small quantity of low-boiling material and 4.0 grams of 2,5-didecyl-1,4-dithiane (B.P. 235–240 at 1.7 mm. pressure).

Example 2

A mixture of 27.3 grams of 1,2-epoxydodecane, 21.3 grams of potassium thiocyanate, and 150 ml. of 90% ethanol was heated under reflux at a temperature of 78° C. After six hours, half of the reaction mass was removed and further processed as in Example 1; the remainder of the mass was refluxed at a temperature of 78° C. for 24 hours, and was then treated as in Example 1.

From the six-hour product, 1.7 grams of forerun material ($n_D^{20}$ —1.4575), boiling from 66–145° C. at 3 mm. Hg, and 4.6 grams of 2,5-didecyl-1,4-dithiane, boiling at 210–245° C. at 2.7 mm. Hg ($n_D^{20}$ 1.4873), were obtained. From the 24-hour portion, 4.3 grams of forerun distillate boiling within the range of 94–190° C. at 3.5–4 mm. ($n_D^{20}$ 1.4575), and 11.3 grams of 2,5-didecyl-1,4-dithiane, boiling principally at 242–246° C. at 2.4–2.8 mm. ($n_D^{20}$ 1.4869), were obtained.

Example 3

Ten grams of 1,2-epithiododecane, 7.2 grams of potassium thiocyanate, and 100 ml. of 95% ethanol were refluxed at a temperature of 78° C. for four hours, and worked up as in Example 1. About 2.9 grams of 2,5-didecyl-1,4-dithiane hexane were isolated (boiling at 245–255° C. at 2.4 mm. Hg ($n_D^{20}$ 1.4919), from the unreacted dodecene sulfide.

A redistilled sample of the 2,5-didecyl-1,4-dithiane boiled at 241–250° C. at 1.7 mm. ($n_D^{20}$ 1.4875). The empirical formula for this compound is $C_{24}H_{48}S_2$, giving a theoretical sulfur content of 16.0%. The sulfur content of the product purified by redistillation was analytically determined as 15.7%. The empirical formula, $C_{24}H_{48}S_2$ represents a molecular weight of 400. The molecular weight of the purified product, as determined cryoscopically in benzene, was 375. These results leave no doubt that $C_{24}H_{48}S_2$ is the correct empirical formula. From structural considerations, scission of the C–S bond in 1,2-epithiododecane must result in the production of a 1,2- or a 1,4-dithiane and the latter is considered more probable.

As will be apparent from the foregoing description and illustrative examples, the instant invention provides a practical method for the production of dithianes or substituted dithianes. The five carbon atom epi-compounds which may be employed in carrying out the instant invention are represented by the following formula:

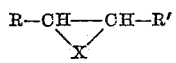

where X is a hetero atom selected from the group consisting of sulfur and oxygen and R and R' are substituent groups which may be alkyl, aryl, alkylene or hydrogen, or non-hydrocarbon substituents, such as sulfur-containing groups, nitriles, carboxyl derivatives, such as esters, ethers, or other functional groups which are unreactive in the presence of alkali metal thiocyanates. Typical epi-compounds, containing at least five carbon atoms per molecule, which may be used in accordance with this invention include alkylene sulfides, such as α-amylene sulfide and 2,4,4-trimethyl-2,3-epithiopentane, and alkylene oxides, such as 1,2-epoxyhexane and 2,4,4-trimethyl-2,3-epoxypentane. Exemplary of the unsaturated episulfides and oxides which may be employed in carrying out the instant invention are isoprene monoxide, etc. In addition, sulfides or oxides of cyclic compounds, including alicyclic compounds, such as cyclohexene sulfide, as well as aromatic derivatives of ethylene sulfide, such as styrene oxide and stilbene oxide, can be utilized. Examples of epi-compounds containing substituents such as ethers, nitriles, etc., include but are not limited to the glycidol derivatives and thioglycidol derivatives, such as allyl glycidol ether, butyl glycidol ether, diglycidol ether, 3-cyano-1,2-epoxybutane, etc., or mixtures thereof.

In order to produce the dithianes of this invention, the subject reaction must be carried out at a temperature of not less than about 50° C. It has been found that suitable yields may be produced employing temperatures from about 64° C.–200° C. To provide a substantially homogeneous reaction system, it is preferred that the reaction be conducted in the presence of a suitable mutual solvent. The selected solvent must be non-reactive with the components of the reaction system, i.e. alkylene epoxide and/or sulfide, and inorganic thiocyanate, and provide at least partial miscibility between the reactants. Examples of suitable solvents include water, ethanol, ethylene and propylene glycol, N,N-dimethyl formamide, 2-ethoxyethanol, diethyleneglycol ethyl ether, etc. While the above-named solvents are effective, methanol and ethanol have been found to be especially suitable.

Inorganic thiocyanates which are utilized in this invention are those which will provide a reactive thiocyanate radical. Salts of thiocyanic acid which can be employed for this purpose include, but are not limited to, the alkali and alkaline earth metals, ammonium, zinc, manganese, iron, and other thiocyanates. The reactants are employed in about equimolar proportions, preferably with an excess of the thiocyanate being present. However, other proportions of reactants may be used, if desired.

While it is preferred to carry out the reaction at atmospheric pressures, it also may be carried out under pressures substantially above or below normal atmospheric pressure. The reaction time, of course, will depend upon the nature of the materials being employed, as well as their respective amounts and the temperature of the reaction. In general, however, it has been found that a reaction period from about 6–24 hours will produce substantial amounts of the desired product.

In recovering the reaction products from the reaction mixture, the dithiane is separated either by filtration or extraction with a water-immiscible, organic solvent in which the dithiane is soluble. Suitable solvents include benzene, petroleum hexane, ether, toluene, etc.

We claim as our invention:

1. A method for preparing substituted dithianes which comprises heating an epi-compound containing at least five carbon atoms per molecule, and having the general formula

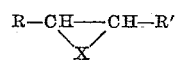

where X is selected from the group consisting of oxygen and sulfur, R is selected from the group consisting of alkyl and aryl radicals, and R' is selected from the group consisting of hydrogen, alkyl, and aryl radicals, with at least an equimolar amount of a compound selected from the group consisting of metal thiocyanates and ammonium thiocyanate, to a temperature in the range from about 50° to 200° C., in solution in a mutual solvent for the reactants, and recovering a dithiane of the formula

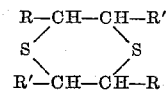

where the R and R' groups are as hereinbefore defined.

2. A method in accordance with claim 1 in which said thiocyanate is an alkali metal thiocyanate.

3. A method in accordance with claim 1 in which said solvent is a lower alkanol.

4. A method in accordance with claim 1 in which X is sulfur.

5. A method in accordance with claim 1 in which X is oxygen.

6. A method in accordance with claim 2 in which the mutual solvent is a lower alkanol.

References Cited in the file of this patent

UNITED STATES PATENTS

| | | |
|---|---|---|
| 1,018,329 | Lilienfeld | Feb. 20, 1912 |
| 2,094,837 | Dachlauer | Oct. 5, 1937 |
| 2,094,914 | Dachlauer | Oct. 5, 1937 |
| 2,183,860 | Coltof | Dec. 19, 1939 |
| 2,346,157 | Farrington | Apr. 11, 1944 |

OTHER REFERENCES

Masson: J. Chem. Soc., vol. 49, pp. 234–237 (1886).